United States Patent Office 3,121,708
Patented Feb. 18, 1964

3,121,708
WATER SOLUBLE REACTION PRODUCTS DERIVED FROM LIGNINS
Lothar Engelmann, Sudbury, Mass., assignor to Chemtan Company, Exeter, N.H., a partnership of New Hampshire
No Drawing. Filed Aug. 22, 1960, Ser. No. 50,854
9 Claims. (Cl. 260—124)

This invention relates to the preparation of novel chemical compounds, and particularly to novel resinous reaction products prepared from certain lignin materials. The compounds referred to can be described in general as the reaction products of an alkali lignin with a salt of an aromatic sulfonic acid and formaldehyde.

The alkali lignins are believed to be of value for certain industrial purposes because of the presence in their molecules of three hydroxyl groups and also because of the substantial absence of sulfo groups. However, they have been found to have the disadvantage of being insoluble in water under even slightly acid conditions. As part of the experimentation leading to the present invention, attempts were made to render the alkali lignin soluble in the presence of acid by reacting it with aromatic sulfonic acids. To accomplish this the alkali lignin was refluxed in aqueous alkaline solution with aromatic sulfonic acids, such as the sodium salt of sulfanilic acid. However, continued refluxing did not prevent precipitation occurring immediately upon the addition of diluted acetic acid to the diluted reaction mixture. A similar attempt was made to interact alkali lignin with formaldehyde, and it was likewise found that immediate precipitation occurred under the same conditions. In fact this reaction resulted in the formation of a product of much higher viscosity, which showed even less solubility in water than the alkali lignin alone.

According to the present invention it is possible to obtain water-soluble reaction products which are substantially acid stable upon dilution with water by interacting in aqueous alkaline solution an alkali lignin with a salt of an aromatic sulfonic acid and formaldehyde in certain specified proportions and heating the mixture together under reflux. If a given amount of alkali lignin is reacted with at least one mol of the sulfonic acid salt and one mol of formaldehyde, water-soluble products are obtained which after dilution with water are resistant to precipitation in the presence of acid in varying degrees. Further, if the amount of formaldehyde is increased, as for example to two mols for every mol of sulfonic acid salt, the resulting product becomes even more readily soluble in water and also of increased resistance to acid precipitation.

While the mechanism of the above reaction is not completely understood, it is believed that under conditions of reflux the various additives condense or couple together, largely due to the presence of the formaldehyde as a condensing or coupling agent, and as a result compounds are formed in which the alkali lignin, formaldehyde and the aromatic sulfonic acid salt are reacted and combined. The products obtained were stable solutions which, after dilution, precipitated only at relatively low pH values upon the addition of acid.

The alkali lignins employed are derived from the manufacture of paper pulp by the sulfate process. A typical alkali lignin material suitable for the purposes of this invention is prepared in a variety of forms by the Polychemicals Division of the West Virginia Pulp and Paper Company and sold under the trademark "Indulin." Certain of these products are insoluble in water, but are soluble in aqueous alkali. Others are prepared in the form of sodium derivatives, which are soluble in water since they form an alkaline solution without adding alkali. Thus, the various forms of Indulin differ from each other primarily in alkalinity, and can be used interchangeably in their alkaline form or in alkaline solution. In general, the alkali lignins are naturally occurring polymers, characterized by a series of closely linked benzene, pyrane and furane rings carrying methoxyl, hydroxyl and other substituent groups. The particular alkali lignin known as "Indulin" is manufactured under conditions that insure a uniform product completely free of wood sugars and similar wood degradation products, and has the following characteristics:

Methoxy groups _____ percent __ 13.9
Hydroxy groups _____ do ____ 14.5
Calculated molecular weight based on 4 methoxy groups _____ 840
Number of methoxy groups per 840 unit _____ 4
Number of hydroxy groups per 840 unit _____ 8
Ash _____ percent __ 0.5–23
Moisture _____ do ____ 3–9

While a wide variety of salts of aromatic sulfonic acids can be used to make the reaction products of this invention, I preferably employ an alkali salt of a naphthol sulfonic acid or of an amino sulfonic acid of the benzene or naphthalene series. Suitable compounds for this purpose include, for example, the sodium, potassium and ammonium salts of sulfanilic acid, naphthionic acid, o-naphthionic acid, 5-amino-1-naphthalene sulfonic acid, 1-naphthol-4-sulfonic acid, and 2-naphthol-6-sulfonic acid.

The formaldehyde employed in the reaction can be used in various forms also. However, it is preferable to employ the aldehyde in the form of paraformaldehyde.

The effect of reacting the several ingredients in various proportions can be readily ascertained from the following table, which tabulates the results of a series of tests, in which the materials were in each instance charged into a three necked flask equipped with stirrer, reflux condenser and thermometer, heated to reflux and refluxed for 2 hours. In each case the sodium salt of alkali lignin was reacted with sodium sulfanilate and paraformaldehyde. The particular sodium salt of alkali lignin used in these tests was a product sold by the West Virginia Pulp and Paper Company under the trademark "Indulin C," which has the characteristics hereinbefore stated and also an average impurities content of 25%. Inasmuch as the molecular weight of the alkali lignins, including "Indulin C," is a matter of conjecture, the products represented by this table were of necessity obtained by reacting a predetermined amount in grams of the sodium salt of alkali lignin with molar quantities of the other reactants. Since the paraformaldehyde was 91% pure, one mol would be contained in 33 grams of the aldehyde. The molecular weight of sodium sulfanilate containing $2H_2O$ is 231.2.

TABLE I

| Test Number | 1 | 2 | 3 | 4 | 5 | 6 | 7 | 8 | 9 | 10 |
|---|---|---|---|---|---|---|---|---|---|---|
| Water (grams) | 131 | 131 | 131 | 131 | 131 | 131 | 131 | 131 | 131 | 131 |
| Sodium salt of alkali lignin (grams) | 56 | 56 | 56 | 56 | 56 | 56 | 56 | 56 | 56 | 56 |
| pHCHO: (grams) | 1.65 | 3.3 | | | 0.825 | 1.65 | 1.65 | 3.3 | 3.3 | 6.6 |
| (mols) | 1/20 | 2/20 | | | 1/40 | 1/20 | 1/20 | 2/20 | 2/20 | 4/20 |
| Sodium sulfanilate: (grams) | | | 11.56 | 23.12 | 5.78 | 5.78 | 11.56 | 11.56 | 23.12 | 23.12 |
| (mols) | | | 1/20 | 2/20 | 1/40 | 1/40 | 1/20 | 1/20 | 2/20 | 2/20 |
| Reflux time (hours) | 2 | 2 | 2 | 2 | 2 | 2 | 2 | 2 | 2 | 2 |
| Ratio of grams of lignin to mols of pHCHO and mols of sulfanilate [1] | X:1:0 | X:2:0 | X:0:1 | X:0:2 | X:½:½ | X:1:½ | X:1:1 | X:2:1 | X:2:2 | X:4:2 |
| Consistency | Heavy gel | Heavy gel | Heavy gel | Heavy gel | Heavy gel | Heavy gel | Gel | Gel | Viscous liquid | Viscous liquid |
| Precipitation pH [2] | 7.0 | 7.0 | 7.0 | 7.0 | 7.0 | 7.0 | 3.3 | 2.45 | >1.9 | >1.9 |

[1] X equals 1120 grams of the sodium salt of alkali lignin.
[2] 100-milliliters of a 5% solution of each reaction product in water was titrated with 4 N formic acid until the solution clouded. The results were accurate within the range of + or − 0.2 pH.

The results as shown in the above table indicate that neither the paraformaldehyde nor the sodium sulfanilate alone have an observable effect upon the solubility properties of the alkali lignin. It is also seen that, in order to obtain products which are substantially stable in the presence of acids, 1120 grams of alkali lignin should be reacted with at least one mol of paraformaldehyde and one mol of sodium sulfanilate. Thus, when proportions such as these are used, the reaction products do not precipitate in the presence of acids, such as acetic acid or formic acid, until the solution has a pH value of about 3.3 or lower. It is also to be noted that an increase of paraformaldehyde and sodium sulfanilate results in a decrease in the viscosity of the solution, and that when 2 molar parts of paraformaldehyde are reacted with one molar part of sulfanilate and the previously mentioned quantity of alkali lignin salt, a more readily soluble reaction product is obtained than when a ratio of one molar part of paraformaldehyde to one molar part of sulfanilate is used. Thus, such products do not precipitate in the presence of acid until the pH value is about 2.5 or lower.

A further understanding of the invention will be obtained from the following examples of methods of preparing water soluble reaction products suitable for the purposes of this invention.

Example I 225 milliliters of water, 80 grams of alkali lignin (Indulin C), 29 grams of sodium sulfanilate crystals and 7.5 grams of paraformaldehyde were charged to a 3 necked flask equipped with a stirrer, reflux condenser and thermometer. The mixture was brought to reflux and refluxed for 3 hours. The solution was then cooled to room temperature and bottled. The solution had a pH value of about 9, was of syrupy consistency and free of any formaldehyde odor. It could be diluted with water to any extent and was stable for at least 9 months. The diluted solution did not precipitate upon the addition of sufficient formic acid to bring it to a pH of 1.9.

Example II 300 milliliters of water, 80 grams of alkali lignin (Indulin C), 14.5 grams of sodium sulfanilate crystals and 3.7 grams of paraformaldehyde were charged to a 3 necked flask equipped as in Example I, and refluxed for 3 hours, after which the solution was cooled to room temperature and bottled. The resulting solution, when diluted, had the same properties as the reaction product described in Example I except that a precipitate formed upon the addition of formic acid to a pH of 2.5.

Example III 200 milliliters of water, 12.5 grams of NaOH, 49 grams of beta-naphthol-sulfonic acid (85%), 80 grams of alkali lignin (Indulin C) and 5.6 grams of paraformaldehyde were charged to a 3 necked flask in the order given, after which the mixture was refluxed and given further treatment as in Example I. The resultant syrupy solution showed the same properties as the product described in Example I.

Example IV 250 milliliters of water, 2.7 grams of NaOH, 13.9 grams of ortho-naphthionic acid, 80 grams of alkali lignin (Indulin C) and 3.7 grams of paraformaldehyde were charged to a 3 necked flask equipped as in Example I, and refluxed for 3 hours, after which the solution was cooled to room temperature and bottled. The resulting solution had the same properties as the reaction product described in Example I except that a precipitate formed upon the addition of formic acid to a pH of 2.5.

Example V 200 milliliters of water, 29.2 grams of sodium naphthionate (95%), 80 grams of alkali lignin (Indulin C) and 3.7 grams of paraformaldehyde were charged to a 3 necked flask equipped as in Example I, and refluxed for 2 hours, after which the solution was cooled to room temperature and bottled. The resulting solution had the same properties as the reaction product described in Example I.

Example VI 200 milliliters of water, 5 grams of NaOH, 73.8 grams of raw 1-naphthol-4-sulfonic acid (58.8%), 80 grams of alkali lignin (Indulin C) and 3.7 grams of paraformaldehyde were charged to a 3 necked flask equipped as in Example I, refluxed for 2 hours, and then cooled to room temperature and bottled. The resulting solution had the same properties as the reaction product described in Example I except that a precipitate formed upon the addition of formic acid to a pH of 2.5.

The alkali lignin used in the above examples is known in the trade as "Indulin C," which is prepared in the form of the sodium salt and is therefore soluble in water. Insoluble forms of alkali lignin, such as the pure form of alkali lignin known as "Indulin A," may also be used, if a small amount of alkali is added to the reaction mixture.

The resinous reaction products prepared as described above are useful in the treatment of penetrable materials, such as tanned leather, fabrics and paper. For example, shaved chrome-tanned leather was first washed for 10 minutes at 140° F., and drained. It was then floated in 100% water at 140° F., after which 5% (based on the solids content) of one of the products referred to in Table I diluted in 25% water at 140° F., was added, and the leather was drummed for 60 minutes, and drained. It was then washed 5 minutes at 130° F., drained, and then floated in 100% water at 130° F. A conventional fatliquor in 25% water at 130° F. was then added, after which the treated leather was drummed 45 minutes, or until the fatliquor was exhausted, horsed up and air dried.

When samples of chrome-tanned leather were treated with the products of tests 7, 8 and 10 (Table I), the following results were noted.

TABLE II

| Leather test No. | Product test No. | Ratios of lignin to pHCHO to sulfanilate | Product | | Fatliquor | | Percent plumping | Temper | Grain | Break |
|---|---|---|---|---|---|---|---|---|---|---|
| | | | pH | Exhaustion | pH | Exhaustion | | | | |
| 1 | 7 | X:1:1 | 4.35 | Fair | 4.2 | Good | 10.5 | S | S-M | T-L |
| 2 | 8 | X:2:1 | 4.0 | do | 4.2 | do | 8.8 | S | S-M | T |
| 3 | 10 | X:4:2 | 3.8 | do | 4.5 | do | 11.8 | S | S-M | T-L |
| 4 | Fatliquor control. | | | | | Complete | 0 | S-M | M | T |

Symbols: Temper—S, soft; M, mellow; F, firm. Grain—S, smooth; M, medium; D, drawn. Break—T, tight; M, medium; L, loose.

The leathers treated as described above were soft and full, and had a smooth grain, a tight break, and showed good plumping. Cloth and paper treated with these products had increased body or feel, increased strength and a decreased tendency to absorb moisture.

While the water soluble reaction products wheich do not precipitate in the presence of acids until the pH value has reached at least 6, or in some instances as low as 1.9, or even lower, are known to be particularly useful in the previously mentioned industrial fields, the neutral or alkaline water soluble reaction products of this invention, which precipitate immediately in the presence of acids, are also useful as impregnation agents, and can be used to advantage in the treatment of fabrics, paper and other similar materials.

Reaction products also containing alkali lignin and likewise useful in the treatment of penetrable materials, but also containing a resin-forming amino compound, such as melamine or urea, are described and claimed in another application filed by me on the same date herewith. This other application is Serial No. 50,855.

What I claim is:

1. The water-soluble reaction product obtained by interacting in an alkaline water solution an alkali lignin with formaldehyde and a substance selected from the group consisting of alkali salts of napthol sulfonic acids and alkali salts of amino sulfonic acids of the benzene and naphthalene series, and heating the aqueous reaction mixture under reflux.

2. The water-soluble reaction product obtained by interacting in an alkaline water solution alkali lignin with paraformaldehyde and the sodium salt of sulfanilic acid, and heating the aqueous reaction mixture under reflux.

3. The water-soluble reaction product obtained by interacting in an alkaline water solution alkali lignin with paraformaldehyde and the sodium salt of naphthionic acid, and heating the aqueous reaction mixture under reflux.

4. The water-soluble reaction product obtained by interacting in an alkaline water solution alkali lignin with paraformaldehyde and the sodium salt of 5-amino-1-naphthalene sulfonic acid, and heating the aqueous reaction mixture under reflux.

5. The water-soluble reaction product obtained by interacting in an alkaline water solution alkali lignin with paraformaldehyde and the sodium salt of 1-naphthol-4-sulfonic acid, and heating the aqueous reaction mixture under reflux., 6. The water-soluble reaction product obtained by interacting in an alkaline water solution alkali lignin with paraformaldehyde and the sodium salt of 2-naphthol-6-sulfonic acid, and heating the aqueous reaction mixture under reflux.

7. The water-soluble reaction product obtained by interacting in an alkaline water solution 1120 grams of an alkali lignin with at least one mol of a polymer of formaldehyde and one mol of a substance selected from the group consisting of alkali salts of naphthol sulfonic acids and alkali salts of amino sulfonic acids of the benzene and naphthalene series, and heating the aqueous reaction mixture under reflux.

8. The method of preparing water-soluble reaction products which comprises interacting in an alkaline water solution an alkali lignin with formaldehyde and a substance selected from the group consisting of alkali salts of naphthol sulfonic acids and alkali salts of amino sulfonic acids of the benzene and naphthalene series in the proportion of 1120 grams of the alkali lignin with at least one mol of formaldehyde and one mol of said substance, and heating the aqueous reaction mixture under reflux until the reaction product remains clear on diluting it with water and acidifying.

9. The method of preparing water-soluble reaction products which comprises interacting in an alkaline water solution an alkali lignin with formaldehyde and a substance selected from the group consisting of alkali salts of naphthol sulfonic acids and alkali salts of amino sulfonic acids of the benzene and naphthalene series in the proportion of 1120 grams of the alkali lignin with at least one mol of formaldehyde and one mol of said substance, and heating the aqueous reaction mixture until the reaction product remains clear on diluting it with water and acidifying.

References Cited in the file of this patent

UNITED STATES PATENTS

| | | |
|---|---|---|
| 2,552,129 | Windus | May 8, 1951 |
| 2,701,749 | Nagy | Feb. 8, 1955 |
| 2,802,815 | Doughty | Aug. 13, 1957 |
| 2,934,531 | Gordon et al. | Apr. 26, 1960 |

UNITED STATES PATENT OFFICE
CERTIFICATE OF CORRECTION

Patent No. 3,121,708                      February 18, 1964

Lothar Engelmann

It is hereby certified that error appears in the above numbered patent requiring correction and that the said Letters Patent should read as corrected below.

Column 1, line 18, for "three" read -- free --.

Signed and sealed this 4th day of August 1964.

(SEAL)
Attest:

ERNEST W. SWIDER
Attesting Officer

EDWARD J. BRENNER
Commissioner of Patents